US006947574B1

(12) United States Patent
Graulich et al.

(10) Patent No.: US 6,947,574 B1
(45) Date of Patent: Sep. 20, 2005

(54) METHOD AND SYSTEM FOR INTERLEAVING OCR AND ABL FOR AUTOMATED MAIL SORTING

(75) Inventors: Markus Graulich, Stuttgart (DE); Joerg Wuertz, Gaertringen (DE)

(73) Assignee: International Business Machines Corporation, Armonk, NY (US)

(*) Notice: Subject to any disclaimer, the term of this patent is extended or adjusted under 35 U.S.C. 154(b) by 619 days.

(21) Appl. No.: 09/633,604

(22) Filed: Aug. 7, 2000

(30) Foreign Application Priority Data

Aug. 11, 1999 (EP) .................................. 99115962

(51) Int. Cl.$^7$ ............................................... G06K 9/00
(52) U.S. Cl. ..................... 382/101; 382/102; 382/176; 382/181; 382/304; 382/321; 209/584; 209/900; 705/401
(58) Field of Search ................................ 382/101, 102, 382/173–188, 137–140, 321, 304; 209/583, 209/584, 900; 705/401

(56) References Cited

U.S. PATENT DOCUMENTS

| | | | | |
|---|---|---|---|---|
| 4,876,735 | A * | 10/1989 | Martin et al. | 382/310 |
| 5,299,269 | A * | 3/1994 | Gaborski et al. | 382/156 |
| 5,475,603 | A * | 12/1995 | Korowotny | 700/213 |
| 5,805,747 | A * | 9/1998 | Bradford | 382/310 |
| 6,028,956 | A * | 2/2000 | Shustorovich et al. | 382/156 |
| 6,269,171 | B1 * | 7/2001 | Gozzo et al. | 382/101 |
| 6,567,546 | B1 * | 5/2003 | Eguchi et al. | 382/181 |
| 6,665,422 | B1 * | 12/2003 | Keil et al. | 382/101 |
| 6,853,989 | B2 * | 2/2005 | Allport et al. | 705/401 |

FOREIGN PATENT DOCUMENTS

WO    WO 98/17405    4/1998

OTHER PUBLICATIONS

Yu et al. "Address Block Location on Complex Mail Pieces." IEEE. 4/97. pp. 897-901.*
Wolf et al. "Fast Address Block Location on Handwritten and Machine Printed Mail-peice Images." IEEE. 4/97. pp. 753-757.*

(Continued)

*Primary Examiner*—Bhavesh M. Mehta
*Assistant Examiner*—Aaron Carter
(74) *Attorney, Agent, or Firm*—Ryan, Mason & Lewis, LLP

(57) ABSTRACT

A method and system for automated sorting machines is provided in which a feedback between OCR and ABL takes place. According to a first aspect of the present invention, a loose coupling between ABL and OCR is proposed in which the ABL system is asked for a further address block potentially present on the letter's surface when the first one being passed from ABL to OCR yielded that no destination ZIP code could be extracted from it. The confidence of the actual OCR and the ABL result, the address block contents supplemented with some additional criteria based on general knowledge, further, the sort plan actually loaded on the concerned sorting machine and the postmark information found in the stamps of the postmark can advantageously be used to make the ABL restart decision. Further, the ABL system can continue to search further address blocks while the OCR system processes one or a plurality of address blocks being passed to it from ABL in a preceding procedure related to the same letter. After being processed by the OCR procedure, a summarizing ranking is calculated for each potential address block found. The best rank is given for the most probable destination address block. In this 'tight' coupling of ABL and OCR processes, basically the same criteria as mentioned above can be used.

15 Claims, 4 Drawing Sheets

OTHER PUBLICATIONS

Dzuba et al. "Handwritten Zip Code Recognition", 1997, IEEE, pp. 766-770.*

Hull et al. "A Blackboard-based Approach to Handwritten Address Recognition", 1988, IEEE, pp. 111-113.*

Mao et al. "A System for Cursive Handwritten Address Recognition", Aug. 1998, IEEE, International Conference on Pattern Recognition 1998, vol. 2, pp. 1285-1287.*

* cited by examiner

```
        RETURN
PLEASE NOTIFY FAX:  1234567                          
      Hr. Maier
        Hauptstrasse 12
  70000 Stuffgart ATTENTION  !
                                              HANDLE
Hr. Mueller                                   WITH
Leopoldstrasse 261                            CARE
80111 Muenchen
```

METHOD AND SYSTEM FOR INTERLEAVING OCR AND ABL FOR AUTOMATED MAIL SORTING

FIELD OF THE INVENTION

The present invention relates to automated mail sorting and, more particularly, to methods and systems for increasing reading rates and lowering error rates by correlation between optical character recognition and address block location techniques.

BACKGROUND OF THE INVENTION

In automated mail sorting systems, the ZIP code of the destination address on post mail, e.g., a letter or a parcel, has to be found. This is usually done by evaluating a digital image of the relevant surface of the piece of mail. This evaluation comprises firstly a procedure called Address Block Location (ABL) which locates a portion of the surface which looks like an address block, or has at least some similarity to it. Then, this portion is selected and passed to an Optical Character Recogntion (OCR) system for further processing aimed to extract a ZIP code associated with the destination address of the post mail so that a sorting machine can sort the mail according to the ZIP code.

In prior art sorting machines, electronic programs running on a computer associated with the sorting machine are implemented to perform the ABL and said OCR procedures after a digital picture has been taken of the letter's or parcel's relevant surface area.

Such a system is disclosed in WO 98 17 405, the disclosure of which is incorporated by reference herein. The above-mentioned procedures are performed sequentially, first ABL, and then OCR. With a great portion of letters or parcels, such systems work quite well even though there remains an error rate which is always worth being lowered. Errors are very often due to confusing the destination address with the return address, both written on the surface.

Problems arise when the size of the envelope or one of the parcels is larger than about DIN B5, as may be the case, very often, particularly with parcels where further remarks, emblems, stamps or the like are printed on the surface. This can be misleading for such ABL systems because any of such emblems or remarks can be interpreted as a potential address block which is then passed to the OCR system and will be evaluated in vain as a destination address block.

SUMMARY OF THE INVENTION

Therefore, an object of the present invention is to provide a method and system for increasing reading rates and lowering error rates.

It is another object of the present invention to provide such method and system with increased processing speed.

According to the present invention, an improved method and system for automated sorting machines is provided in which a feedback between OCR and ABL takes place. According to a first aspect of the present invention, a loose coupling between ABL and OCR is proposed in which the ABL system is asked for a further address block potentially present on the letter's or parcel's surface when the first one being passed from ABL to OCR yielded a result that no destination ZIP code could be extracted from it. Thus, a first result of a first OCR procedure is fed back to the ABL system as a trigger signal in order to restart the ABL for providing the OCR system with a second proposal for a destination address block.

The 'restart ABL' decision is based advantagously on at least one of the following types of information described below.

The decision may be based on the confidence of the actual OCR result, i.e., how good was the first 'address block object' readable result. Thus, misleading address blocks, e.g., emblems having the outer shape of an address block (e.g., a rectangle filled with small symbols or characters), can be excluded as a sorting criterion as blocks which actually do not comprise any ZIP code or the name of a town.

Further, as the address block contents are known after being processed by the OCR procedure, any character information recognized by the OCR can be evaluated with some additional criteria based on general knowledge. For example, if the address block contents comprise a character string like 'Fax' or 'Phone,' it can be derived, with a high probability, that the actual address block represents the return address instead of the destination address. It is obvious that a lot of further examples for knowledge-based criteria can be found and used.

Further, ABL confidence is evaluated primarily with respect to the position, size, outer shape and inner structure found with the address block.

Further, the sort plan actually loaded on the concerned sorting machine can be visited for gathering more information. It holds information on incoming and outgoing mail, and on the town and its ZIP code in which the sorting machine is placed. Thus, assuming the local town in which the machine is installed is a small town and the ZIP code evaluated by the first run of the OCR is that of said small town, the probability is high that the found address block is the return address and must thus be rejected as a destination address. The larger the town, e.g., a city, the less reliable will be such a conclusion as, for example, in London, UK, many letters are destined to another location in London.

Similarly, postmark information can be evaluated as the stamp visible on a postmark designates the name and/or the ZIP code of the town in which the letter was stamped, which is in most cases the return address town.

Such evaluations can be performed and qualified in various ways independent of the concepts of the present invention. In order to concentrate on the real core of these concepts, only a simple and exemplary way is given below on how to qualify these evaluations for a conclusive decision whether or not to accept an address block as a destination address. To do that, some qualifying results (intermediate or final results) are constructed in the form of so-called 'confidence values,' further referred to as CF-value (i), i=1, 2, . . . 4, which are, e.g., normalized between zero (0) and one (1). Zero (0) means that no indication can be derived from the evaluated information for having found a destination address block, and one (1) means a strong indication for having found a destination address. These CF-values (i) represent intermediate results related each to some special information evaluated. In order to get a usable total qualification of an address block, all intermediate results are considered, compared to each other and are evaluated including many particular context conditions which in turn are dependent from case to case. Thus, for example, by multiplication of all CF(i)-values, a CF-total value can be yielded. A CF-total of 1.0 would then mean that the destination address block is found with a probability of nearly 100%.

With reference back to the restart of the ABL system, the step of restarting the ABL system can be, of course, repeated as long as the available processing time allows it until a destination ZIP code can be extracted having a high probability of correctness.

The methodology of the present invention has the advantage, as compared to the above-described prior art technique, that the error rate is decreased due to the feedback of information from the OCR result to the ABL system. Consequently, the costs for manually sorting are reduced.

In a preferred embodiment of the invention, an ABL system continues to search further address blocks while the OCR system processes one or a plurality of address blocks being passed to it from the ABL system in a preceding procedure related to the same letter. After being processed by the OCR procedure, a summarizing ranking is calculated for each potential address block found. The best rank is given for the most probable destination address block. In this 'tight' coupling of ABL and OCR processes, basically the same criteria as mentioned above can be used. However, as a further advantage, the ABL and the OCR processes can be performed concurrently, except the first ABL process which is the required input for the first run of any OCR procedure. A feedback from ABL to OCR or to an OCR-and-ABL-embedding 'calling' program part can advantageously be provided in order to signal to the OCR and to said caller program part that no more reliable address blocks can be found. This represents a bi-directional feedback between both OCR and ABL which can, of course, be interleaved as well. The feedback actions can be passed directly from ABL to OCR or, via the embedding caller program part from which ABL and OCR processes are controlled and invoked, respectively.

Thus, overall processing time is decreased in relation to the work which is done. Further, as all potential address blocks are analyzed, the error rate can be further reduced.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
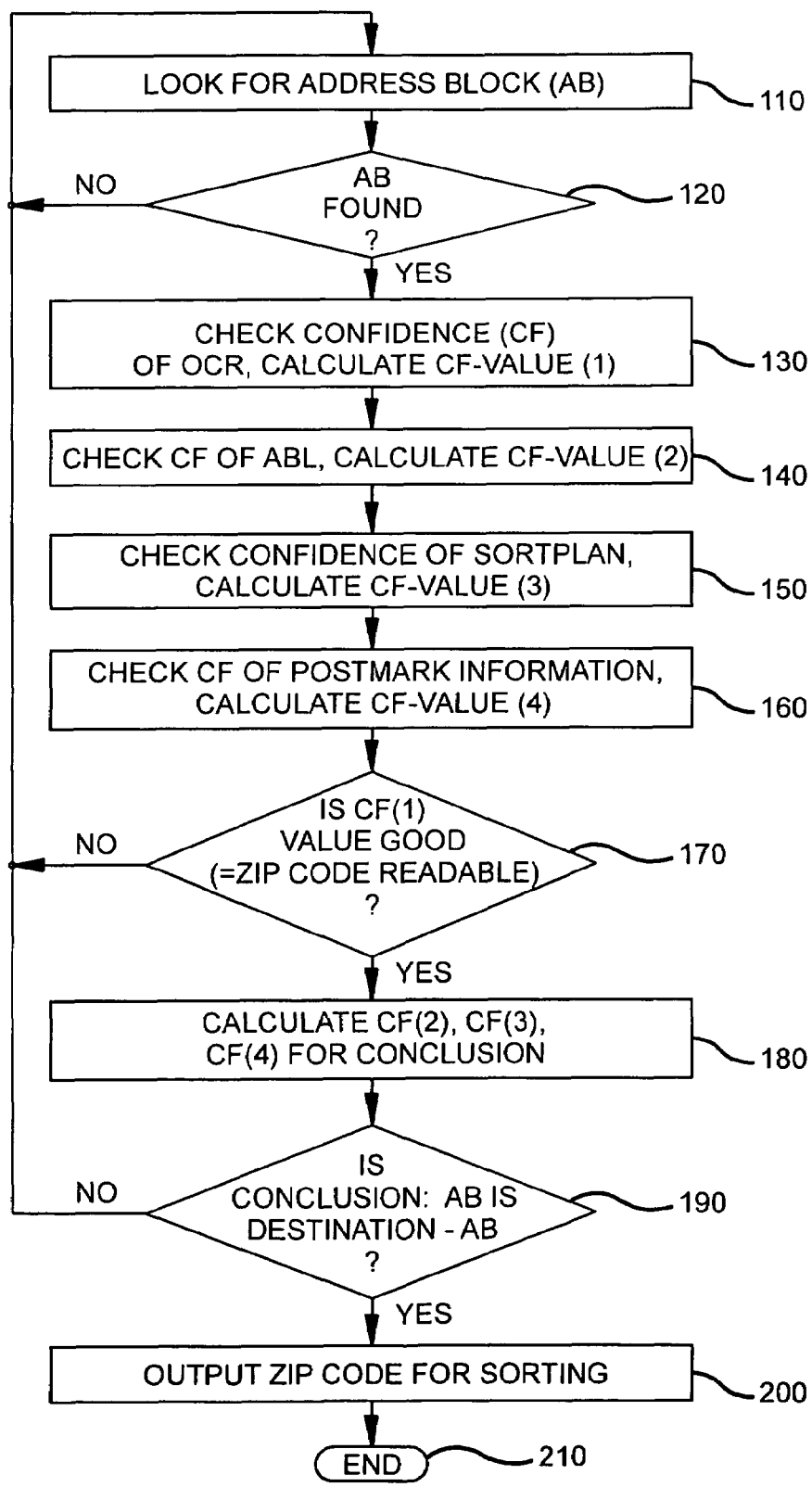
FIG. 1 is a schematic representation of a block diagram showing the steps and the control flow of a method according to a first aspect (loose coupling) of the invention.

With general reference to the figures and with special reference now to FIG. 1, the steps of a method according to the invention are described next below.

It is assumed that a large size letter is subjected to the automated sorting machine having a computer associated therewith for implementing one or more programs for performing the methodology of the invention. For instance, the letter may be destined to an address having the ZIP code of Munich, Germany and having a return address with the ZIP code of Stuttgart, Germany. Both respective address blocks may be present on the letter, but, exemplarily, both blocks may be nearly equal in size and, complicating the case, the destination address block may be placed at an unusual location at the left lower corner of the envelope. Further, the return address block may comprise the words: 'please notify' and 'FAX 0711-89898989, z.H., Hr. Maier'. It may also be further assumed that the postmark information discloses a ZIP code relating to Stuttgart as well, and that a remark:
ATTENTION!
HANDLE
WITH
CARE is visible at a location at which usually the destination address is found.

In a first step, the letter is subjected to the initial ABL procedure (step 110). As the remark:
ATTENTION!
HANDLE
WITH
CARE has nearly the outer shape of a rectangle and is found on the usual location of the destination address block, the ABL processing will offer that remark first to the OCR procedure, steps 110 and 120 (Yes branch). The pattern is thus processed by OCR. As 100% of the characters comprising the pattern were recognized, the pure OCR quality is qualified as very well. As, however, the remark does not comprise any ZIP code, no good confidence rating, in the form of the above-mentioned confidence value CF-Value (1) normalized between 0 (no indication for having found a destination address block) and 1 (strong indication for having found a destination address), is assigned to it at step 130.

It should be noted that by order of sequence in which they are mentioned in the text, such CF-values are denoted from CF(1) to CF(4). Thus, CF(1) would be somewhere around 0.3. It is obvious that the remark cannot yet be excluded as a destination address block as it could be that the ZIP code was just forgotten to be printed on the letter and the word 'CARE' could be a name of a town, as well.

Then, in a step 140, the confidence of an ABL result relating to the current address block that has just been localized is calculated. Thus, a CF(2) value is constructed which reflects, e.g., the location of the address block relative to other locations of the surface area of the letter. Here, a high value is assigned for locations being the usual ones for the placing of the destination address block, e.g., in the central area of a parcel cover or the left-central or right-central position on a standard DIN B5 letter. Low values, however, are assigned for extraordinary locations.

Further, the size, the outer shape and the inner structure of the address block found is evaluated by the ABL system or by an appended program invoked from a suited location in the program. Thus, in the case depicted in FIG. 3, a quite high value component CF(2)1 is assigned for the location itself as it is quite central, further, the outer shape resembling a rectangle having straight, horizontal inner line structures yields a high value component CF(2)2 as well, and the size being not extraordinary for a destination address block leads to a quite high value component CF(2)3 as well, thus yielding a CF(2) total of around 0.8, when the components are aggregated into one resulting value.

Then, in a next step 150, the actually loaded sort plan is checked which yields that there would be a high probability for Stuttgart to be mentioned in a return address which is however, not yet found. As, for example, 'CARE' is the most probable town name in the address block found by the ABL, it is seen that CARE does not coincide with Stuttgart and it is decided that the current address block can still be the destination address block with a forgotten ZIP-code. In conclusion, a balanced value of, e.g., 0.5 is assigned as a CF(3) value.

Then, in a step 160, the postmark information is checked by ABL and OCR. It is assumed to reveal Stuttgart and a respective ZIP code as the town where the letter was stamped. Thus, the information gathered in conjunction with step 150 is further affirmed, and the same value of 0.5 is assigned as CF(4) value.

Then, advantageously, a cross-check of a table comprising towns and their respective ZIP code can be performed in order to see, if 'CARE' is the name of a town in Germany or within a region in Europe, or worldwide, respectively. It is assumed that the result is negative, a town 'CARE' is unknown. Also, optionally, a cross-check of expressions often found in warnings or further remarks written on letters or parcels is performed which would, of course, comprise the text pattern 'handle with care'.

Then, a comprehensive intermediate conclusion is undertaken, primarily respecting the fact whether a ZIP code could be extracted from the processed address block. It should be understood that, generally, there might be respected the results found in steps 140, 150, 160, as well, for example in cases in which the OCR result is quite ambiguous, when, e.g., the ZIP code of the town has such a large distance to the name of the town that only the town name is recognized as a part of the current address block. This can then in turn be taken as a trigger for restarting the ABL system for locating the missing ZIP-code directly and feeding it seperately to the OCR system as an annex to the address block currently being processed.

Figure 3:
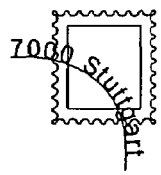
FIG. 3 is a sketch of an envelope front side which may be subjected to the methods according to the first and second aspect of the invention.

Thus, back to the case depicted in FIG. 3 and explained in the context of FIG. 1, it is decided in a decision step 170 that a further address block is asked for from the ABL system without performing a particular complex CF-total calculation as depicted in step 180 which however will be done and described with the next address block. Thus, a direct feedback step happens from OCR to ABL, and ABL is restarted via the NO branch of step 170.

Then, in a second run of the ABL, the address block depicted in the upper left corner of the large size letter which contains the return address is proposed by the ABL system and is input to the OCR, steps 110, 120.

Then, steps 130 to 160 are repeated according to the above-described sequence. Other results are derived, however. In particular, performing step 130 is assumed to yield a well readable result, and, additionally a ZIP code can be extracted. Further, a text string 'PLEASE NOTIFY' and another one, namely, 'FAX' followed by a number is extracted from the OCR procedure. As mentioned above, this is interpreted as an argument indicating that a return address is found instead of the destination address. Thus, in summary, a low CF(1) value of, e.g., 0.1, is assigned to the second address block indicating that the probability is high that the found address is not the destination address.

Step 140 yields a balanced CF(2) value of around 0.5, which is assigned since the position is extraordinary, the size, however is normal, and the inner structure and outer shape is the expected one of an address block.

Performing step 150 yields a relatively low CF(3) value of, e.g., 0.3, since the sort plan reveals the same ZIP code, i.e., that it is the one of the town in which the letter is sorted, as indicated on the second address block.

Then, in step 160, the postmark information is checked yielding the same value of CF(4)=0.3 as the letter was stamped in Stuttgart, which is indicated on the actually found address block. Thus, steps 150 and 160 yield a high probability that the found address block is the return address and not the desired destination address.

Decision 170 is then left via the Yes branch as at least a ZIP code could be extracted.

Then, in a step 180, a summarizing calculation of the assigned CF(i) values is performed for calculating a conclusion whether or not to reject the actually processed address block as a destination address. Generally, this calculation can comprise one or more of many particular algorithms relating to how to process the CF(i) values, for example, a special function which weights the CF(i) values in an appropriate way, or some particular direct exclusion in order to reject the address block from being used as a destination address, as, for example, in case of the presence of a FAX number. Dependent therefrom, the CF(i) values are processed. In here, a simple calculation of simply multiplying the calculated CF(i) values is proposed for reasons of simplicity only as this concerns not the actual core of the invention itself.

Thus, it is calculated: 0.1×0.5×0.3×0.3, yielding a CF-total value of 0.0045. This low total value is quite a good indication that the found address block is not the destination address block. Thus, it is concluded in decision step 190 to ask the ABL system to look for another address block which is more probably the destination address. Thus, a further feedback to ABL takes place which involves a third run of the ABL process which in turn will find the destination address in the lower left corner of the letter, finally.

Step 130 yields a high CF(1) value as the address block is quite well readable, and a ZIP code, i.e., that one of Munich (Muenchen), Germany, can be extracted, and no exclusive text strings could be resolved from OCR in the address contents. Thus, a CF(1) value of 1.0 can be assigned.

Further, step 140 is performed which respects the unusual position in the lower left corner of the letter's envelope, but also the good coincidence with an address block concerning size, outer shape and horizontal line structure. Thus, a total CF(2) value of around 0.7 is assigned calculated by an arithmetic, appropriately weighted mean value of the components, for example.

Further, steps 150 and 160 yield a high CF(3) and CF(4) value of both 1.0, as the ZIP code of the sort plan home location and that one of the postmark information do not coincide with the ZIP code found in the currently processed address block.

Thus, decision step 170 is left via the YES branch, a summarizing CF-total value of 1.0×0.7×1.0×1.0=0.7 is calculated in step 180 and the conclusion of step 190 is that the CF-total value is high enough for proposing a destination ZIP code to the sorting machine as, additionally, no direct exclusive conditions were found which exclude the address block directly from being proposed as a destination address block. Thus, the currently found address block is proposed as the destination address block of the letter and the ZIP code of Munich is output to the sorting machine for sorting the letter into the respective folder designated for Munich (step 200). Then, the sorting procedure is completed (step 210).

Figure 2:
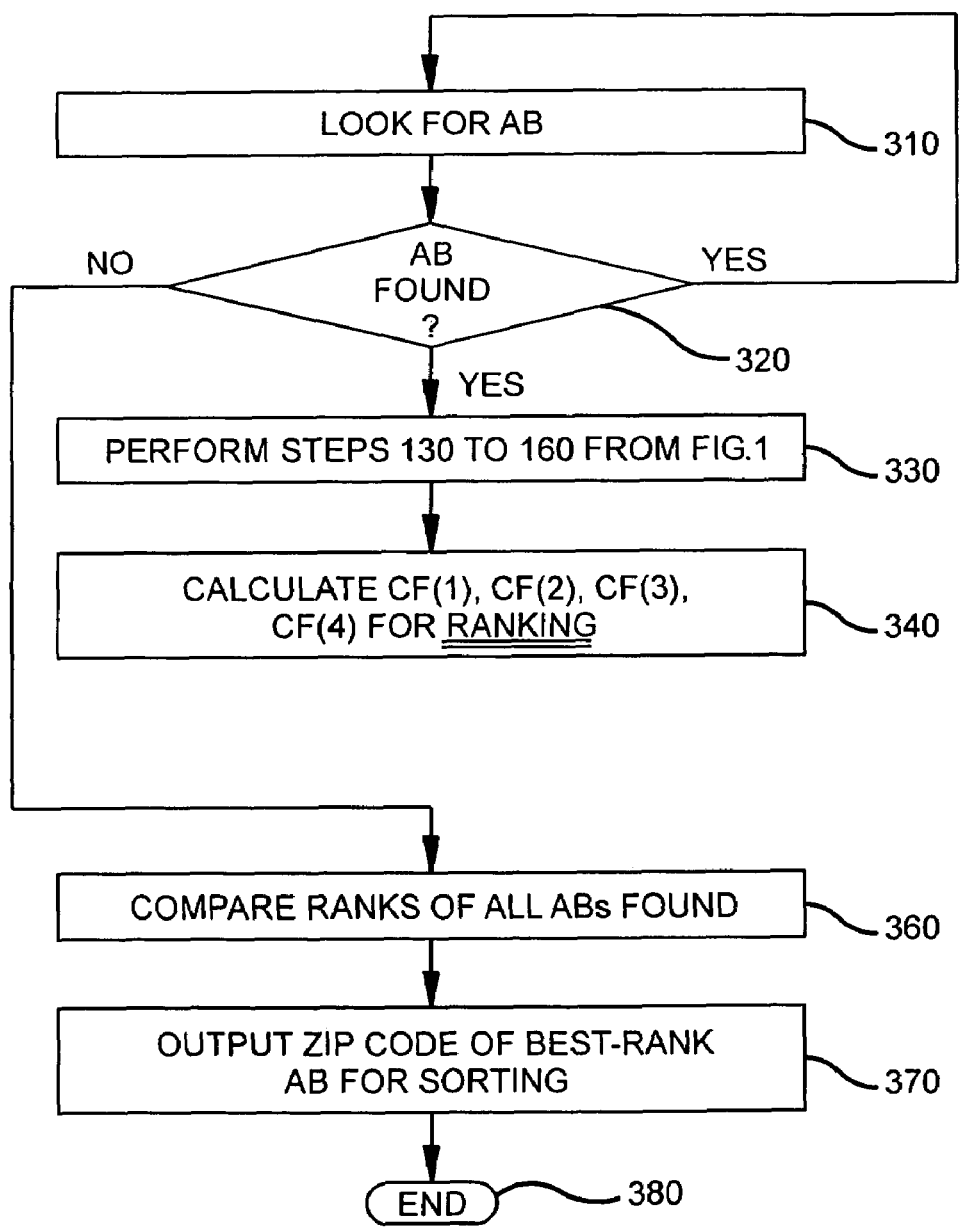
FIG. 2 is a schematic representation of a block diagram showing the steps and the control flow of a method according to a second aspect (tight coupling) of the invention.

With additional reference now to FIG. 2, a second aspect of the present invention disclosing a tight coupling between ABL and OCR processes is described next below.

Here, the ABL system first processes the remark 'ATTENTION! HANDLE WITH CARE' (steps 310, 320). This potential address block is passed to the OCR system for further processing, i.e., for performing the steps described in conjunction with steps 130, 150 and 160 of FIG. 1, as depicted in step 330 of FIG. 2. The way to process the address block is basically the same as that one described above, i.e., CF(i) values are calculated and assigned to the address block found. As depicted in step 340, however, in contrast to the above-described procedure, the CF(i) values are collected and saved in a dedicated storage area for a ranking made up between further address blocks still to be found during concurrent processing of the ABL system, i.e., the second YES branch leading to the next looking run of the ABL system (step 310).

Thus, the ABL system continues to search further address blocks—here, the next block is that one with the return address—while the OCR system may still process the first one. Optionally, a buffer memory is provided for storing data the ABL system has retrieved and which the OCR system is not yet able to process.

As will be appreciated by a person skilled in the art, the processes of the ABL and the OCR systems are concurrent in time which represents the tight coupling between them and which yields a great advantage compared to the prior art, i.e., efficiciently using the computational resources present in the automatic sorting machine's computer system.

Finally, no more address blocks are found in decision step 320. All address blocks present on the letter's surface have now been located by the ABL system. This can be a decisive difference to the embodiment just described above which terminates ABL activity when—deviating from the example given in FIG. 3—an address block is found which is qualified by the embedding calling program as good enough for being accepted as a destination address block. In such a case, a further address block might be found later in time which is considered to have a higher probability to be the destination address block than the block having the relatively good probability found before.

After all address blocks are processed by the OCR procedure, the embedding program calculates a summarizing ranking covering each potential address block found (step 360). The ranks are compared and the best rank is used as an indication for the most probable destination address block, the ZIP code of which is output for sorting the letter properly (step 370). Then, the sorting procedure is completed (step 380).

Figure 4:
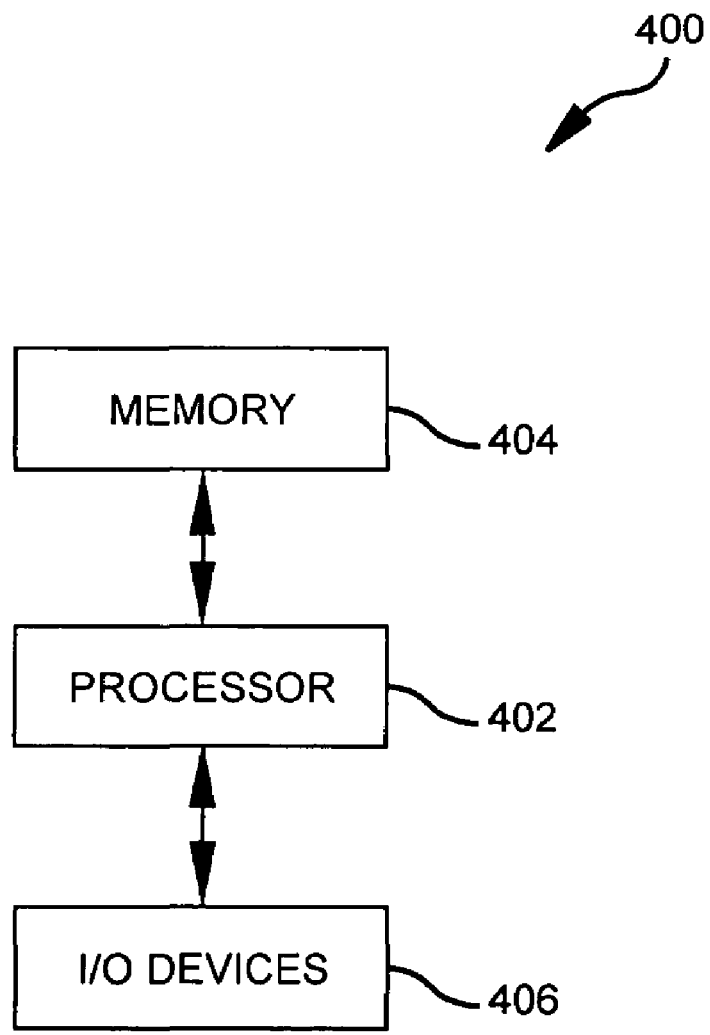
FIG. 4 is a block diagram illustrating a generalized hardware architecture of a computer system suitable for implementing methodologies according to the present invention.

Referring now to FIG. 4, a block diagram is shown illustrating a generalized hardware architecture of a computer system suitable for implementing the methodologies of the present invention. That is, the illustrative architecture depicts the computational resources present in the automatic sorting machine's computer system wherein the methodologies described herein including the ABL and OCR procedures may be executed. Of course, such methodologies may be implemented on more than one such computer system.

As shown, the computer system 400 may be implemented in accordance with a processor 402, a memory 404 and I/O devices 406. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. The I/O devices may also include a scanning device for capturing the digital image of the mail surface to be processed. It is also to be understood that the term "processor" may refer to more than one processing device and that various elements associated with a processing device may be shared by other processing devices. Accordingly, software components including instructions or code for performing the methodologies, as described herein, may be stored in one or more of the associated memory devices (e.g., ROM, fixed or removable memory) and, when ready to be utilized, loaded in part or in whole (e.g., into RAM) and executed by a CPU.

In the foregoing specification, the invention has been described with reference to two specific exemplary embodiments thereof. It will, however, be evident that various modifications and changes may be made thereto without departing from the broader spirit and scope of the invention as set forth in the appended claims. The specification and drawings are accordingly to be regarded as illustrative rather than in a restrictive sense.

In particular, the control flow depicted in the drawings should be regarded as illustrative only. Many variations are possible to achieve the same abstract goals, i.e., providing a feedback from OCR to ABL and/or to run ABL and OCR processes concurrently in time.

Further, many exclusive conditions can be retrieved which exclude an address block from being further processed and treated as a potential destination address block. Into such knowledge-based conditions, all general knowledge can be imported which has accumulated in the post offices all over the world. And, finally, it will be appreciated that those conditions will vary from country to country or from continent to continent.

What is claimed is:

1. A computer-based method for use in accordance with an automatic mail sorting machine, the method comprising the steps of:
    scanning a piece of post mail in accordance with an address block locating (ABL) system for locating one or more address blocks on the piece of post mail;
    analyzing the one or more located address blocks in accordance with an optical character recognition (OCR) system;
    determining at least one confidence value, for each of the one or more located address blocks, associated with at least one of: (i) address block format characteristics; (ii) data retrievable by a sort plan associated with a site of the automatic mail sorting machine; and (iii) postmark information retrievable from a postmark; and
    providing a coupling between the ABL system and the OCR system capable of feeding one or more results associated with the ABL system as an input to the OCR system and one or more results associated with the OCR system as an input to the ABL system.

2. The method of claim 1, wherein the coupling is provided such that the ABL system scans for a further address block when no ZIP code could be extracted by the OCR system from the current address block currently being analyzed.

3. The method of claim 1, wherein a type of information that is evaluated in deciding whether the ABL system scans for a further address block is at least one of: (i) confidence of the OCR result relating to the current address block just analyzed; (ii) address block content information; (iii) confidence of the ABL result relating to the current address block just localized; (iv) data retrievable by a sort plan associated with a site of the automated sorting machine; (v) postmark information retrievable from a postmark; and (vi) knowledge-based information derivable from at least one of the types of information in (i) through (v).

4. The method of claim 1, further comprising the step of providing a coupling between the ABL system and the OCR system in which the ABL system continues to scan for further potential address blocks after having found at least one potential address block while the at least one potential address block is being processed by the OCR system.

5. The method of claim 4, further comprising the step of providing a ranking for each of the address blocks, being at least one of located and analyzed, for finding the most probable destination address block.

6. The method of claim 5, wherein a type of information that the ranking is based on is at least one of: (i) confidence of the OCR result relating to each of the address blocks; (ii) address block content information; (iii) confidence of the ABL result relating to the current address block just localized; (iv) data retrievable by a sort plan associated with a site of the automated sorting machine; (v) postmark information retrievable from a postmark; and (vi) knowledge-based information derivable from at least one of the types of information in (i) through (v).

7. The method of claim 4, wherein one or more operations associated with the ABL system and the OCR system are performed at least partly concurrently.

8. Apparatus for use in accordance with an automatic mail sorting machine, the apparatus comprising:
at least one processor operative to: (i) scan a piece of post mail in accordance with an address block locating (ABL) system for locating one or more address blocks on the piece of post mail; (ii) analyze the one or more located address blocks in accordance with an optical character recognition (OCR) system; (iii) determine at least one confidence value, for each of the one or more located address blocks, associated with at least one of: (a) address block format characteristics; (b) data retrievable by a sort plan associated with a site of the automatic mail sorting machine; and (c) postmark information retrievable from a postmark; and (iii) provide a coupling between the ABL system and the OCR system capable of feeding one or more results associated with the ABL system as an input to the OCR system and one or more results associated with the OCR system as an input to the ABL system.

9. The apparatus of claim 8, wherein the coupling is provided such that the ABL system scans for a further address block when no ZIP code could be extracted by the OCR system from the current address block currently being analyzed.

10. The apparatus of claim 8, wherein a type of information that is evaluated in deciding whether the ABL system scans for a further address block is at least one of: (i) confidence of the OCR result relating to the current address block just analyzed; (ii) address block content information; (iii) confidence of the ABL result relating to the current address block just localized; (iv) data retrievable by a sort plan associated with a site of the automated sorting machine; (v) postmark information retrievable from a postmark; and (vi) knowledge-based information derivable from at least one of the types of information in (i) through (v).

11. The apparatus of claim 8, wherein the at least one processor is further operative to provide a coupling between the ABL system and the OCR system in which the ABL system continues to scan for further potential address blocks after having found at least one potential address block while the at least one potential address block is being processed by the OCR system.

12. The apparatus of claim 11, wherein the at least one processor is further operative to provide a ranking for each of the address blocks, being at least one of located and analyzed, for finding the most probable destination address block.

13. The apparatus of claim 12, wherein a type of information that the ranking is based on is at least one of: (i) confidence of the OCR result relating to each of the address blocks; (ii) address block content information; (iii) confidence of the ABL result relating to the current address block just localized; (iv) data retrievable by a sort plan associated with a site of the automated sorting machine; (v) postmark information retrievable from a postmark; and (vi) knowledge-based information derivable from at least one of the types of information in (i) through (v).

14. The apparatus of claim 8, wherein one or more operations associated with the ABL system and the OCR system are performed at least partly concurrently.

15. An article of manufacture for use in accordance with an automatic mail sorting machine, comprising a machine readable medium containing one or more programs which when executed implement the steps of:
scanning a piece of post mail in accordance with an address block locating (ABL) system for locating one or more address blocks on the piece of post mail;
analyzing the one or more located address blocks in accordance with an optical character recognition (OCR) system;
determining at least one confidence value, for each of the one or more located address blocks, associated with at least one of: (i) address block format characteristics; (ii) data retrievable by a sort plan associated with a site of the automatic mail sorting machine; and (iii) postmark information retrievable from a postmark; and
providing a coupling between the ABL system and the OCR system capable of feeding one or more results associated with the ABL system as an input to the OCR system and one or more results associated with the OCR system as an input to the ABL system.

* * * * *